United States Patent
Pong et al.

(10) Patent No.: US 12,518,127 B2
(45) Date of Patent: Jan. 6, 2026

(54) RFID SYSTEM

(71) Applicant: Sato Holdings Kabushiki Kaisha, Tokyo (JP)

(72) Inventors: Tai Wai Pong, St Peters (AU); Graham Murdoch, St Peters (AU)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/860,813

(22) PCT Filed: Apr. 28, 2023

(86) PCT No.: PCT/IB2023/054404
§ 371 (c)(1),
(2) Date: Oct. 28, 2024

(87) PCT Pub. No.: WO2023/209648
PCT Pub. Date: Nov. 2, 2023

(65) Prior Publication Data
US 2025/0342337 A1    Nov. 6, 2025

(30) Foreign Application Priority Data
Apr. 29, 2022  (AU) ................ 2022901127

(51) Int. Cl.
*G06K 19/077* (2006.01)
*G06K 7/10* (2006.01)

(52) U.S. Cl.
CPC ... *G06K 19/07773* (2013.01); *G06K 7/10297* (2013.01)

(58) Field of Classification Search
CPC .............. G06K 16/07773; G06K 7/10297
See application file for complete search history.

(56) References Cited

U.S. PATENT DOCUMENTS 7,102,519 B2 * 9/2006 Lyon ............... G06K 19/07758
235/385
2003/0179151 A1 * 9/2003 Senba ............ G06K 19/07749
343/895

(Continued)

FOREIGN PATENT DOCUMENTS

| EP | 1 793 326 A2 | 6/2007 |
| EP | 1 970 838 A2 | 9/2008 |
| EP | 3 722 988 A1 | 10/2020 |

OTHER PUBLICATIONS

International Search Report dated Jul. 19, 2023, issued in counterpart International Application No. PCT/IB2023/054404. (3 pages).

*Primary Examiner* — Matthew Mikels
(74) *Attorney, Agent, or Firm* — WHDA, LLP (57) ABSTRACT

An RFID system for tracking tagged items comprises an RFID reader and an RFID antenna coil arrangement in communication with the RFID reader. Each item has an RFID tag with a tag antenna coil and each item is positioned in a fixed location. The RFID antenna coil arrangement comprises a plurality of conductively connected antenna coils, wherein each antenna coil is oriented in a plane perpendicular to an orientation of the RFID tag antenna coil associated with the respective tagged item. Each antenna coil is also positioned to be aligned with the fixed location of a respective tagged item, so that the RFID tag antenna coil couples with a fringing flux produced by the antenna coil.

11 Claims, 11 Drawing Sheets (56) References Cited

U.S. PATENT DOCUMENTS

2008/0224826 A1 9/2008 Kuwako et al.
2020/0302260 A1 9/2020 Ochi

* cited by examiner

FIGURE 20

RFID SYSTEM

CROSS-REFERENCE TO RELATED APPLICATIONS

The present application claims priority from Australian Provisional Patent Application No 2022901127 filed on 29 Apr. 2022, the content of which is incorporated herein by reference.

TECHNICAL FIELD

The present disclosure relates, generally, to radio-frequency identification and, more particularly, to an RFID system for tracking tagged items.

BACKGROUND

Radio-frequency identification (RFID) is a wireless identification technology that can be used to track items, for example for inventory tracking. Data is electronically stored on a tag that is attached to an item, and the data is readable by an RFID reader in order to identify, locate, and/or track the tagged item. When the items that need to be tracked are medical items, such as blood bags, medicine, vaccines, etc., the RFID system used to track the items must be able to operate within the required conditions. For example, if the items are kept at a low temperature, then the RFID system must be able to operate inside a fridge.

Clotting factor medication used to treat haemophilia is an example of medication that requires refrigerated storage. At home, patients typically keep a number of boxes in their fridge, and they will restock the boxes of medication when they run out.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

In one aspect there is provided an RFID system for tracking tagged items, each item having an RFID tag with a tag antenna coil and each item positioned in a fixed location, the RFID system comprising: an RFID reader; and an RFID antenna coil arrangement in communication with the RFID reader, the RFID antenna coil arrangement comprising a plurality of conductively connected antenna coils, wherein each antenna coil is: oriented in a plane perpendicular to an orientation of the RFID tag antenna coil associated with the respective tagged item, and positioned to be aligned with the fixed location of a respective tagged item, so that the RFID tag antenna coil couples with a fringing flux produced by the antenna coil.

Each antenna coil may have a circumference similar to its respective tagged item, and each antenna coil may be positioned to align its circumference with the circumference of its respective tagged item.

The circumference of the coil may be aligned with the circumference of the tagged item so that a portion of the tag antenna coil and a portion of the reader antenna coil are aligned and parallel.

The tagged items may be cylindrical and have a variable radial orientation.

The RFID antenna coil arrangement may comprise an array of antenna coils that comprises: an input conductor forming a first series of coil elements; and an output conductor forming a second series of coil elements, wherein the first series of coil elements and the second series of coils are conductively connected, and wherein the first series of coil elements is superjacent or subjacent to the second series of coil elements.

These and other aspects and features will now become apparent to those skilled in the art upon review of the following description of specific non-limiting embodiments in conjunction with the accompanying drawings.

BRIEF DESCRIPTION OF DRAWINGS

The detailed description of illustrative (non-limiting) embodiments will be more fully appreciated when taken in conjunction with the accompanying drawings in which:

FIG. 9A is a schematic representation of an RFID tag and an item that the RFID tag is affixed to.

In the drawings, like reference numerals designate similar parts.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DESCRIPTION

Reference will now be made in detail to various non-limiting embodiments of methods and systems for determining the location of an item in a storage system. It should be understood that other non-limiting embodiment(s), modifications and equivalents will be evident to one of ordinary skill in the art in view of the non-limiting embodiment(s) disclosed herein and that these variants should be considered to be within scope of the appended claims.

Furthermore, it will be recognized by one of ordinary skill in the art that certain structural and operational details of the non-limiting embodiment(s) discussed hereafter may be modified or omitted (i.e., non-essential) altogether. In other instances, well known methods, procedures, and components have not been described in detail.

Figure 1:
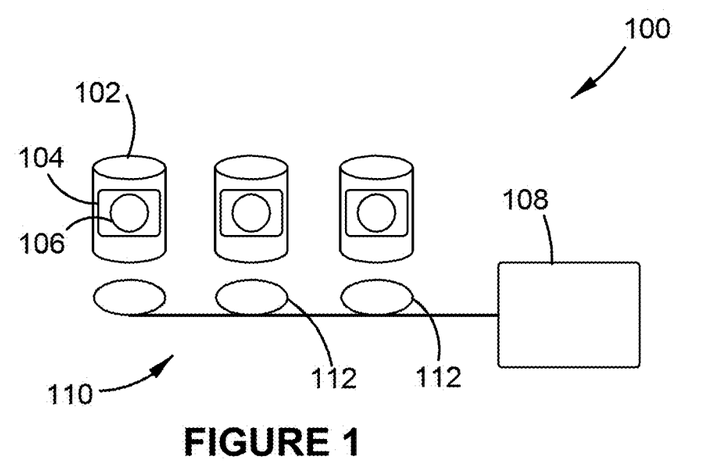
FIG. 1 is a schematic representation of a non-limiting embodiment of an RFID system.

FIG. 1 of the drawings shows an RFID system 100 for tracking tagged items 102. Each item 102 has a label in the form of an RFID tag 104 with a tag antenna coil 106, and each item 102 is positioned in a fixed location. The RFID system 100 comprises an RFID reader 108 and an RFID antenna coil arrangement 110 in communication with the RFID reader 108. The RFID antenna coil arrangement 110 comprises a plurality of conductively connected antenna coils 112. Each antenna coil 112 is oriented in a plane substantially perpendicular to an orientation of the RFID tag antenna coil 106 associated with the respective tagged item 102. Each antenna coil 112 is positioned to be aligned with the fixed location of a respective tagged item 102 so that the RFID tag antenna coil 106 couples with a fringing flux produced by the antenna coil 112.

The items 102 may be cylindrical, such as bottles. Each reader antenna coil 112 may be substantially circular with a circumference substantially the same as the circumference of the respective tagged item (for example a cylindrical bottle). For each antenna coil 112 in the coil arrangement 110, the circumference of the coil 112 is aligned with the circumference of the tagged item 102 so that a portion of the tag antenna coil and a portion of the reader antenna coil are aligned. The portion of the tag antenna coil and the portion of the reader antenna coil may be parallel to one another.

The items 102 may have variable radial orientation, so that an item may be rotated around a central axis with the item positionable with more than one possible orientation.

Figure 2:
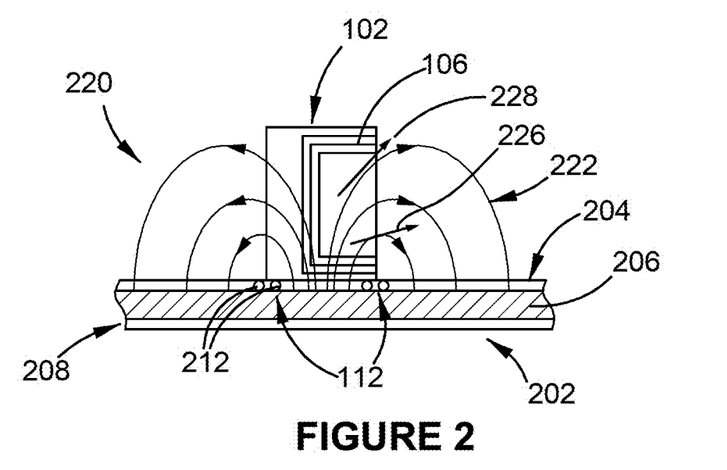
FIG. 2 is a schematic representation of magnetic field lines from a reader antenna.

FIG. 2 of the drawings shows a side view of an item 102 positioned in a container that has a floor 202. In this non-limiting embodiment, the RFID antenna coil arrangement 110 is incorporated in a printed circuit board (PCB) 204 that is placed on the floor 202, or incorporated into the floor in a comparable manner, for example positioned inside or below the floor of the container, or otherwise associated with the floor so that the antenna coils of the antenna arrangement are oriented to lie in the plane of the floor of the container.

Figure 3A:
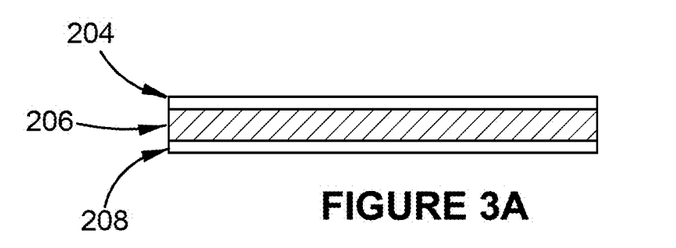
FIG. 3A is a cross section of a reader antenna screen.
Figure 3B:
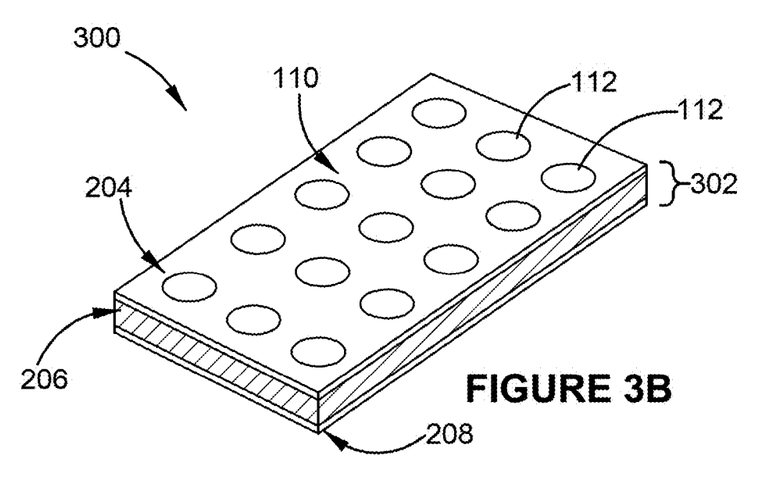
FIG. 3B is a perspective view of an RFID reader antenna that includes the reader antenna screen of FIG. 3A.

To shield the antenna coils 112 from the effects of any metal in the surrounding environment (for example wire racking in a fridge), a ferrite layer 206 and an aluminium layer 208 are provided under the RFID antenna coil arrangement 110 to channel the electromagnetic field away from the underside of the PCB 204 and back up to the area above the RFID antenna coil arrangement 110. The sandwich structure for the PCB 204, ferrite layer 206 and aluminium layer 208 is illustrated in FIGS. 3A and 3B of the drawings. In this non-limiting embodiment, a ferrite layer of 25 mm to 3.5 mm and an aluminium sheet of 0.2 mm to 2 mm (or greater) is used. FIG. 3B is a schematic representation of an RFID reader antenna 300 comprising a coil arrangement 110 for reading a plurality of tagged items, and comprising a ferrite and aluminium screen 302. The screen comprises a ferrite layer 206 and an aluminium layer 208.

The antenna coil has one or more conductor turns. The antenna coil 112 illustrated in FIG. 2 has concentric conductor turns 212, and the resulting magnetic field 220 is illustrated with the curved and spreading magnetic field lines 222. Further away from the coil 112 the magnetic field becomes weaker. Also, further away from the coil 112 the magnetic field has a different orientation as the field lines spread out. This can be understood when comparing the more horizontal angle of arrow 226 associated with the magnetic field line close to the coil 112 with the more vertical angle of arrow 228 associated with the magnetic field line furthest from the coil 112.

Figure 4:
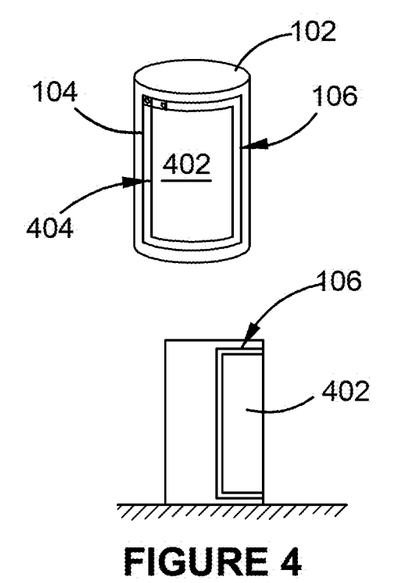
FIG. 4 shows a perspective and a side view of a tagged item with an RFID tag.

Magnetic flux is a measure of the total magnetic field that passes through a given area. As can be seen in FIG. 4 of the drawings, the item 102 has an RFID tag 104 with a tag antenna coil 106. In this non-limiting embodiment, the tag antenna coil 106 has two coil turns 404 and an inner area 402. Referring again to FIG. 2 of the drawings, the magnetic flux that results from the magnetic field that passes through the tag antenna coil's inner area 402, induces an electromotive force, EMF (or voltage) as defined by the rate of change of the magnetic flux. The more magnetic flux generated by the coil 112 that passes through the inner area 402 of the tag antenna coil 106, the stronger the coupling will be between the reader antenna coil 112 and the tag antenna coil 106. The magnetic field lines that spread out further away from the coil, result in a similarly spreading magnetic flux which is referred to herein as "fringing flux".

If the reader coil and tag coil lie in parallel planes, a strong magnetic coupling is possible because of the optimal relative orientation of the two coils. However, for some applications, for example for tagged medical items, the RFID tag 104 is required to be applied to the side of the item 102 in such a way that the tag coil is in a plane perpendicular to the plan that the antenna coil is in (as illustrated in FIG. 2, for example). The result is that a horizontal reader coil is used to read a vertically positioned tag coil. The RFID system described herein is able to do this by providing an array of reader coils, the coils positioned to be aligned with fixed locations of respective tagged items so that the RFID tag antenna coils couple with a fringing flux produced by the reader antenna coil.

Figure 5:
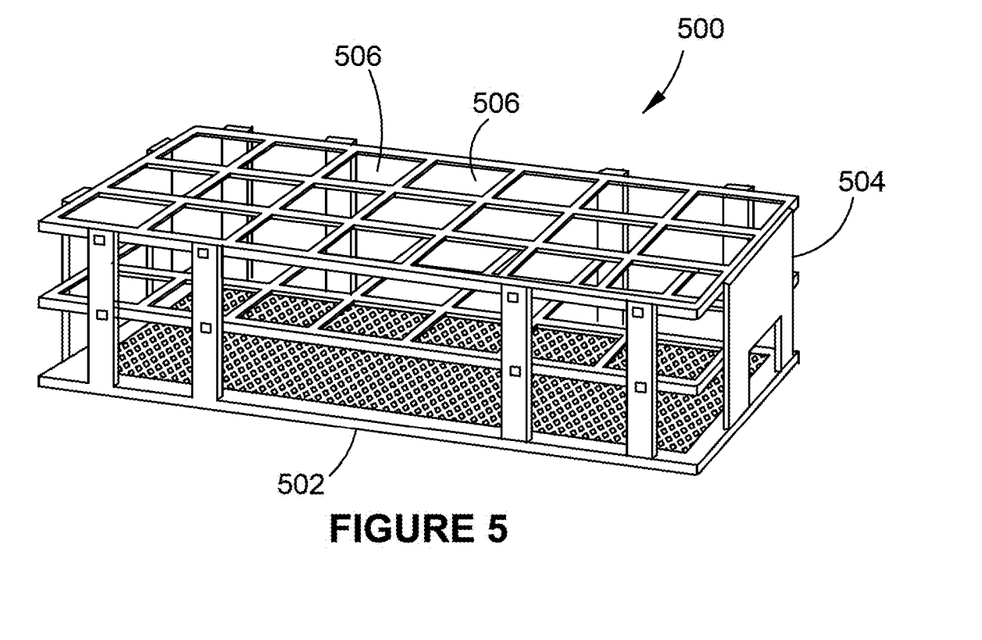
FIG. 5 is a perspective view of a tray for holding items in fixed positions inside the tray.

In one non-limiting embodiment, the RFID system is used to track medical items in the form of boxed medication arranged in a tray. FIG. 5 of the drawings is a perspective view of a tray 500 used to hold boxes of medication. The tray has a floor 502 supporting a frame 504 that defines receiving zones 506 configured to receive the boxes and hold the boxes in fixed locations.

Figure 6:
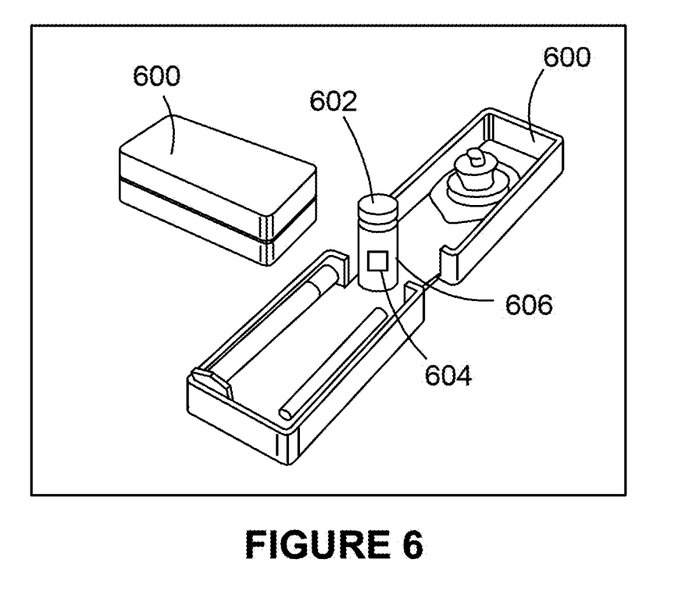
FIG. 6 shows a closed and an open container holding a tagged item.

FIG. 6 shows an example of a closed medication box 600, and an open medication box 600 with a medication bottle 602 held therein. The medication bottle 602 has a label 606 with an RFID tag 604.

Figure 7:
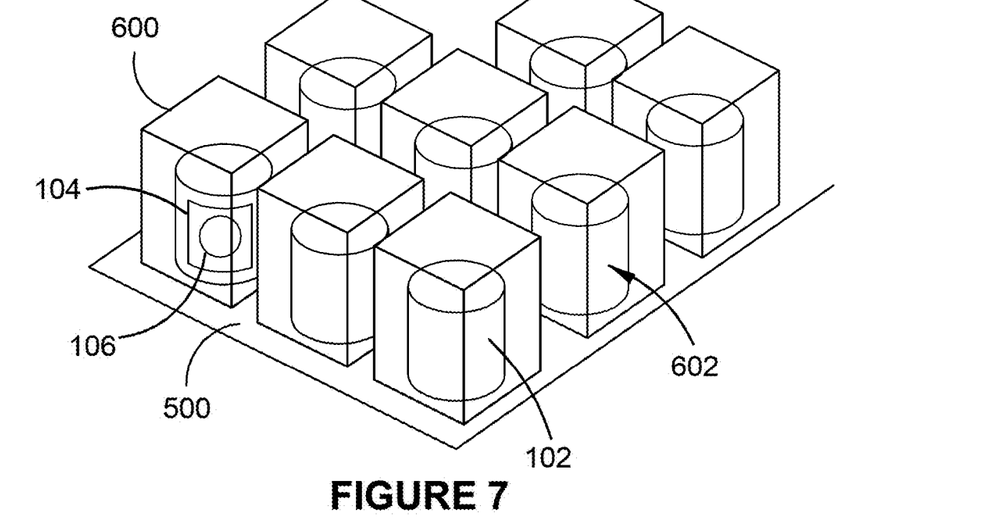
FIG. 7 is a perspective view of a plurality of boxed items positioned in a tray.
Figure 8:
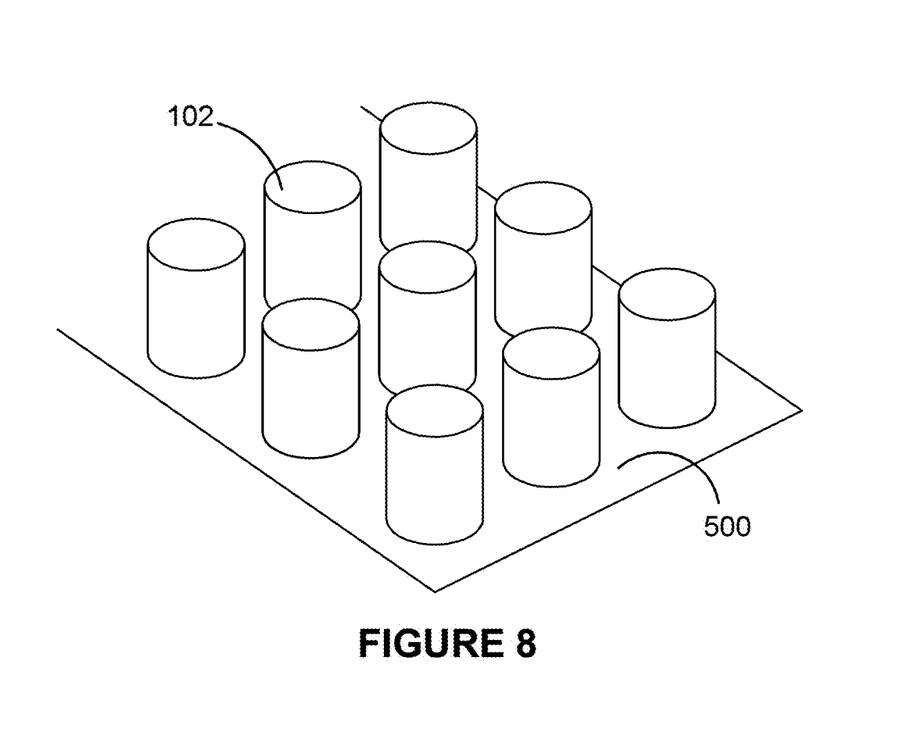
FIG. 8 shows the fixed locations of items held in a tray.

FIG. 7 is a schematic representation of medication boxes 600, each holding a medication bottle 602, positioned in the tray 500. In this exemplary embodiment, the medication bottles 602 are tagged items 102, each having an RFID tag 104 with a tag antenna coil 106. Because the bottles are in a fixed position inside the boxes, and the boxes are held in a fixed position in the tray, it means that the tagged items are positioned in a fixed location as shown in FIG. 8.

In one non-limiting embodiment (which may, for example, be used for clotting factor medication used to treat haemophilia) medication bottles have a small tag placed on the side of the bottle. The requirement is to have the bottles monitored in real time while in a fridge using RFID. In addition, there is a requirement to support near-field communication (NFC) reading of the bottle label by the patient when the patient administers the contents. The NFC read would typically be done with a smart phone device. Therefore, the tag must be readable with both an RFID antenna associated with the tray and an NFC reader (e.g. using a smart phone device).

Figure 9A:
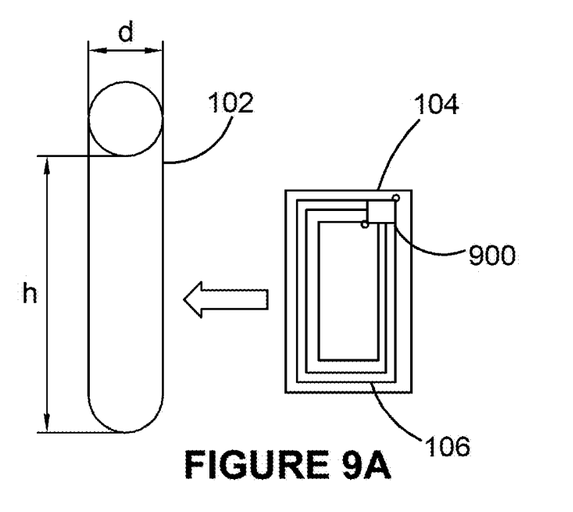
Figure 9B:
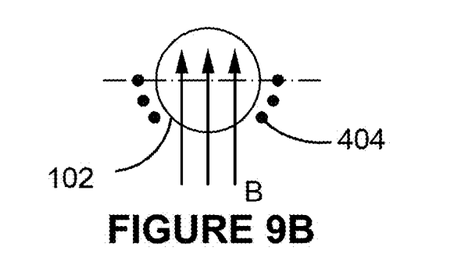
FIG. 9B is a section view of the RFID tag affixed to the item of FIG. 9A.
Figure 9C:
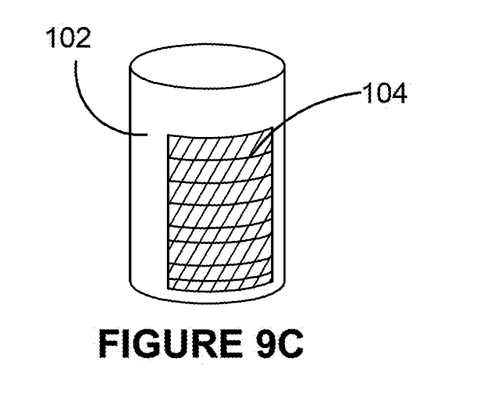
FIG. 9C is a perspective view of the RFID tag affixed to the item of FIG. 9A.

To be readable with an NFC reader the tag must be readable by a field that travels from one side of the bottle through the bottle to the other side. For this reason, the tag used is a tag 104 folded over about half of the bottle 102 as shown in FIGS. 9A, 9B and 9C. The tag 104 has a tag antenna coil 106 with a plurality of antenna coil turns 404, and the antenna 106 is connected to a tag chip 900. In the exemplary embodiment the chip 900 includes both NFC and RFID functionality, and the tag antenna coil 106 is suitable for both NFC and RFID communication. The chip 900 may be, for example, a Sato D Series PJM Chip.

Figure 10:
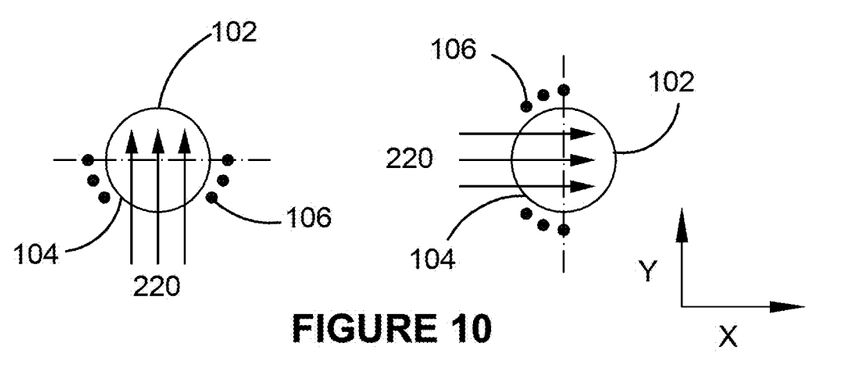
FIG. 10 is a schematic representation of a first and a second radial orientation of a tagged item.
Figure 11:
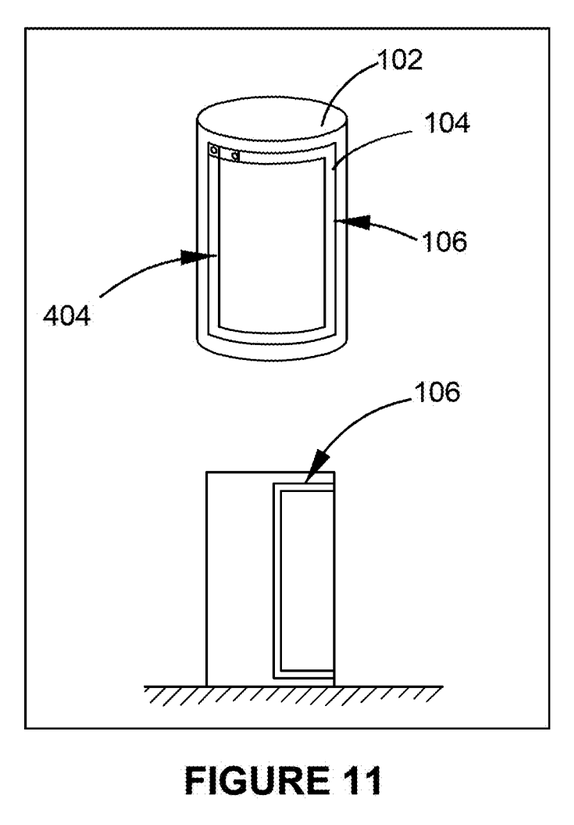
FIG. 11 shows a perspective and a side view of a first and a second radial orientation of a tagged item.

The bottles are inside boxes that are racked in a tray in a fridge so that they all stand upright. The orientation of the tag on the bottle is not controllable because the bottle can be turned around its axis inside the box and hence the reading of the bottle tag on the tray must be orientation-insensitive in a radial direction. Because the bottle can be turned in any direction the orientation of the tag and the required reading field will change. For example, FIGS. 10 and 11 show the effect of rotating the bottle 90 degrees: the magnetic field 220 needs to be directed in such a way that the magnetic flux passes through the inner area 402 of the tag antenna coil 106 irrespective of the orientation. Therefore, in a first orientation the magnetic field 220 would need to be in a first direction (the Y direction) for coupling to occur, and in a second orientation the magnetic field 220 would need to be in a second direction (the X direction) for coupling to occur.

The reading field needs to be arranged to cope with any orientation of the bottle. Normally this would be done using a 3D field generated by a complex and expensive antenna arrangement. The RFID system described herein provides a simpler solution that takes advantage of the known location of the bottles and the radial symmetry of the rotation of the bottle around its central axis.

Figure 12:
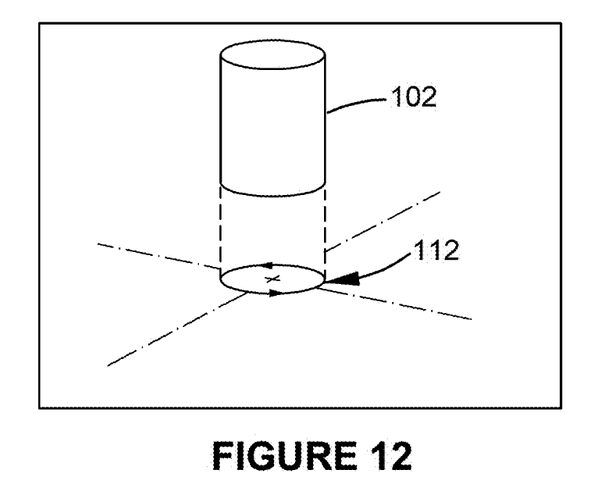
FIG. 12 is a schematic representation illustrating the alignment of a tagged item and a reader antenna coil.
Figure 13:
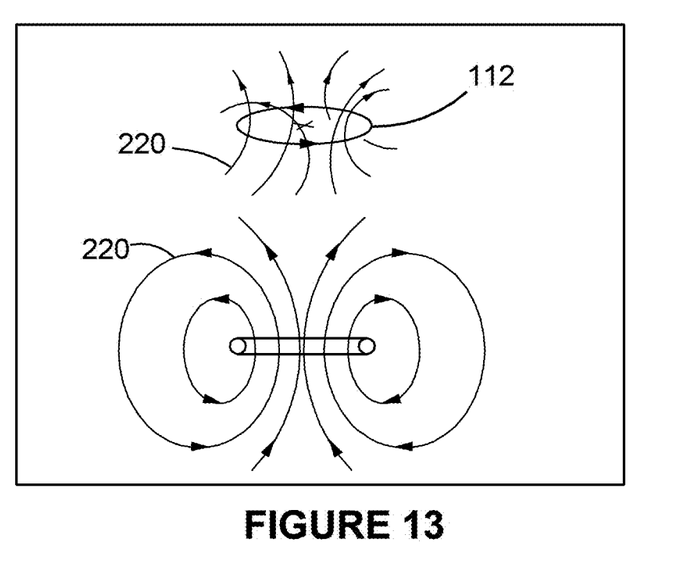
FIG. 13 is a schematic representation of the magnetic field lines produced by a reader coil.
Figure 14:
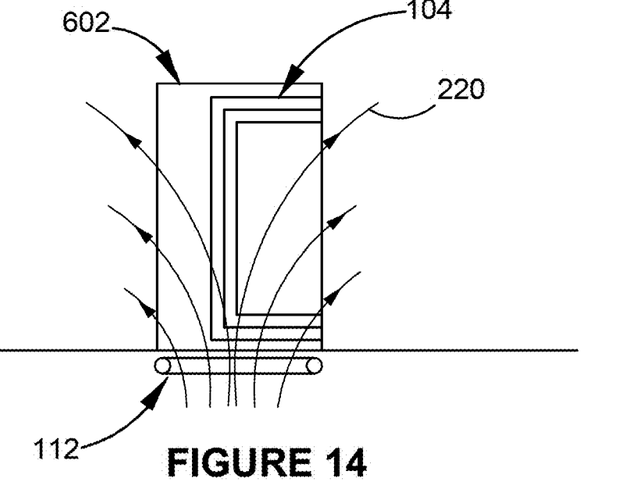
FIG. 14 illustrated the magnetic field line produced by a reader coil relative to a tag antenna on an item positioned above the reader coil.

As illustrated in FIG. 12, a circular coil 112 of the same (or similar) size to the item 102 is positioned underneath and centred on the bottle centre so as to align the coil 112 with the fixed location of the respective tagged item 102. FIG. 13 illustrate the field lines emerging from the coil in perspective and in cross-section. As shown in FIG. 14, when the bottle with a tag 104 as described is placed on the circular coil a significant portion of the reading field passes through the coil.

Figure 15:
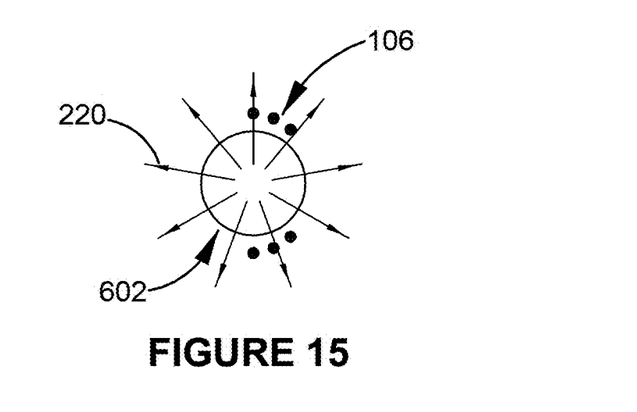
FIG. 15 is top view schematic representation of the radial magnetic field produced by a reader antenna.

When viewed from above, as illustrated in FIG. 15, the radial symmetry of the reading field and the independence from any effects of bottle rotation are evident. No matter how the bottle is rotated the same amount of field couples to the coil.

Figure 16:
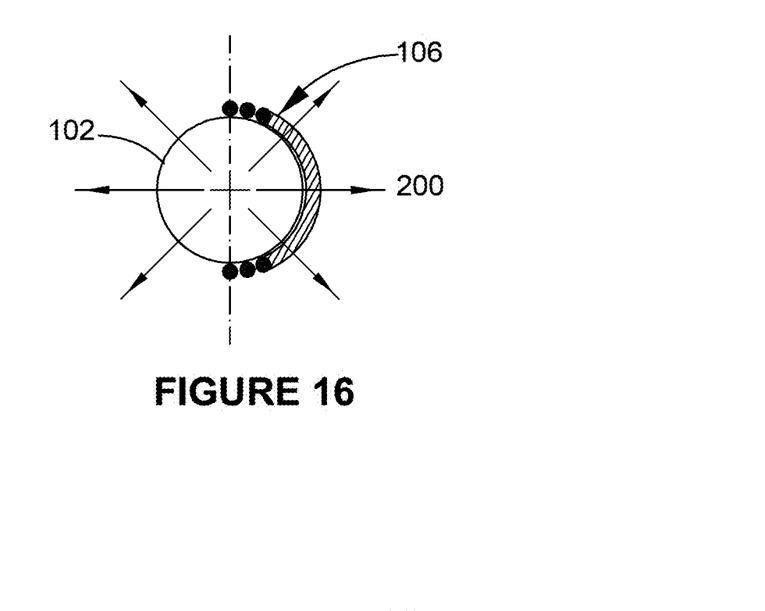
FIG. 16 is top view schematic representation of the radial magnetic field of FIG. 15 relative to the RFID tag of a tagged item.

The maximum coupling occurs when the reader's antenna coil 112 is sized and positioned so that the coil 112 lies along the circumference of the item as shown in FIG. 16. The label is wrapped around half of the item so that the tag antenna coil 106 extends around half of the item and is aligned with half of the reader's antenna coil 112. Accordingly, about half of the reading field 220 passes through the tag 104; this is the maximum coupling achievable consistent with the tag 104 also being used for NFC reading where the tag must be readable by a field that travels from one side of the bottle through the bottle to the other side. If the antenna coil 106 extends more than half way around the item the coupling from the straight through NFC field is diminished.

Figure 17:
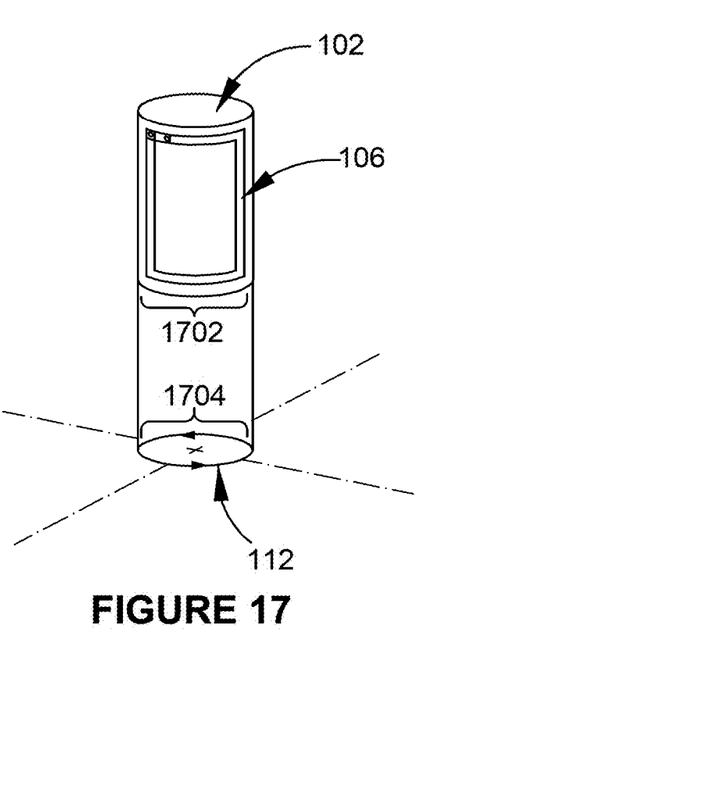
FIG. 17 illustrates the alignment of a tagged item and a reader antenna coil.

In the non-limiting embodiment illustrated in FIG. 17, the reading coil 112 has a circumference that is the same as, or similar to, the circumference of the item 102. The coil 112 is positioned to be under the item 102, aligned with the circumference of the item and as close to the item as possible. The circumference of the coil 112 is aligned with the circumference of the tagged item 102 so that a portion 1702 of the tag antenna coil and a portion 1704 of the reader antenna coil are aligned. The portion 1702 of the tag antenna coil and the portion 1704 of the reader antenna coil may be parallel to one another.

The reader coil 112 has N turns. The coil acquires an EMF (or voltage) as defined by the rate of change of the magnetic flux. For the type of tightly wound coil used here, the voltage is proportional to the number of turns, N, of the coil:

$$\varepsilon = -N\frac{d\Phi}{dt}$$

Therefore, the more turns N in the coil, the larger the voltage produced by the coil when interrogated by an RFID reader.

Figure 18:
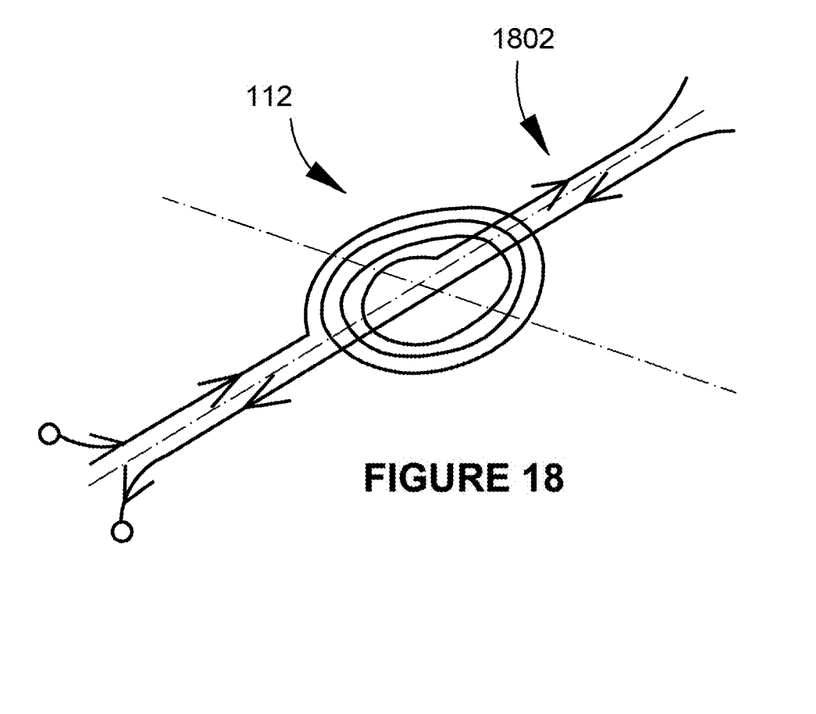
FIG. 18 shows a non-limiting embodiment of a reader antenna coil having concentric coil turns.

Referring to FIG. 18 of the drawings, each reader coil 112 has N turns, and is connected in series with other coils with one or two pairs of connecting coil conductors 1802. In some embodiments the N turns are concentric, which means that each individual turn has a different radius. In other embodiments, to ensure that the radius of the N turns is similar to the radius of the tag coil positioned around the circumference of the item, the N turns of the reader coil have the same radius or have similar radii. In such embodiments the turns cannot be concentric, and instead are configured to be stacked or layered.

Figure 19:
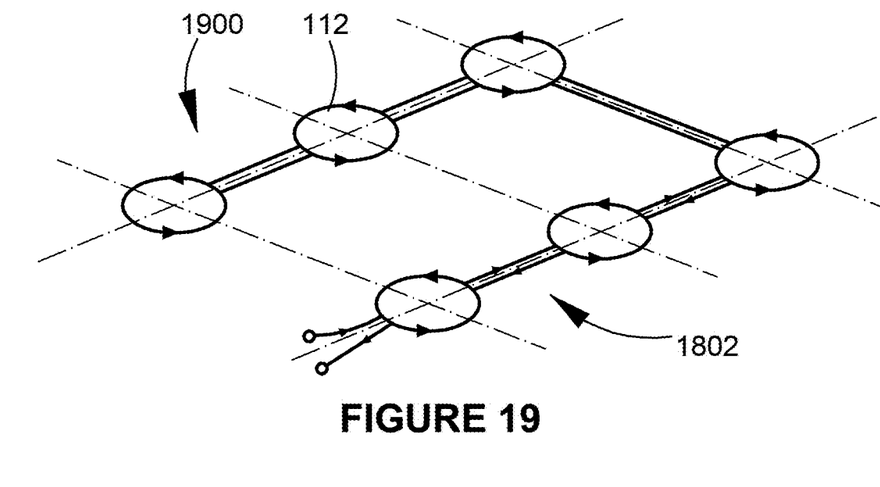
FIG. 19 is a schematic representation of a non-limiting embodiment of an array of reader coils.
Figure 20:
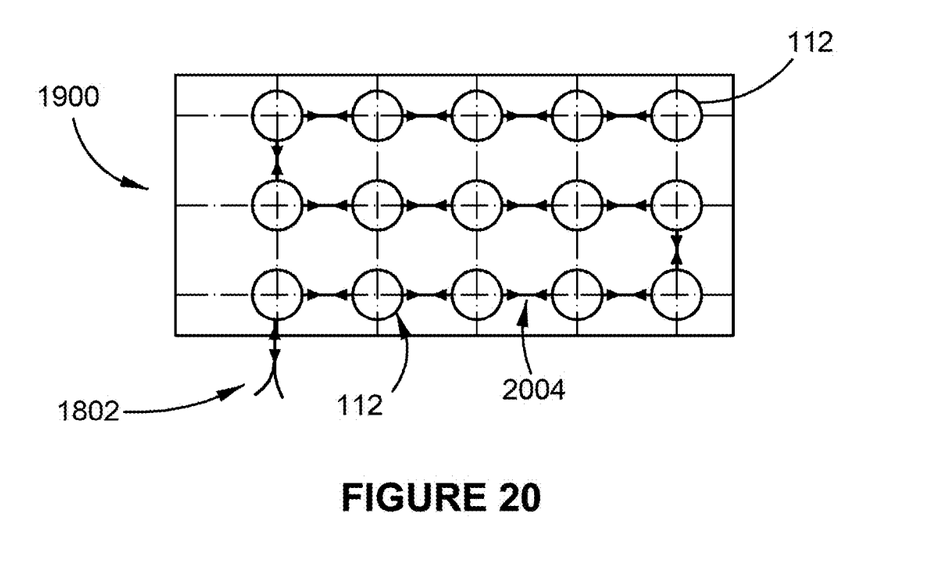
FIG. 20 shows another non-limiting embodiment of an array of reader coils.

As illustrated in FIG. 19, the coils 112 can be series connected to create an array 1900 of reading coils. The inductance of one or more coils 122 can be cancelled by a series-connected capacitor or capacitors (not shown). As illustrated in FIG. 20, the array can be extended by series connection of a plurality of reader coils 112. Each coil 112 may have one or more turns, and adjacent coils are connected together via a series connection 2004.

In one non-limiting embodiment, an array of antenna coils comprises an input conductor forming a first series of coil elements and an output conductor forming a second series of coil elements. The first series of coil elements and the second series of coil elements are conductively connected, for example the input and output conductor may be the same conductor, or may be connected via a conducting component such as a wire, soldering, one or more capacitors and/or resistors, etc. The first series of coil elements is superjacent or subjacent the second series of coil elements so that each antenna coil 112 comprises a first coil element superjacent (or subjacent) a second coil element. Both coil elements that form the antenna coil comprise turns in an opposite direction, for example, the first element may be wound clockwise while the second element may be wound anti-clockwise. This is so that the direction of current (ingoing in the first element and outgoing in the second element, for example) is the same, thereby resulting in similar magnetic fields that sum together to enhance the magnitude of the magnetic field produced by the antenna coil.

It is noted that the foregoing has outlined some of the more pertinent non-limiting embodiments. It will be clear to those skilled in the art that modifications to the disclosed non-embodiment(s) can be effected without departing from the spirit and scope thereof. As such, the described non-limiting embodiment(s) ought to be considered to be merely illustrative of some of the more prominent features and applications. Other beneficial results can be realized by applying the non-limiting embodiments in a different manner or modifying them in ways known to those familiar with the art. The mixing and matching of features, elements and/or functions between various non-limiting embodiment(s) is expressly contemplated herein so that one of ordinary skill in the art would appreciate from this disclosure that features, elements and/or functions of one embodiment may be incorporated into another embodiment as appropriate, unless described otherwise, above. Although the description is made for particular arrangements and methods, the intent and concept thereof may be suitable and applicable to other arrangements and applications.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments.

The invention claimed is:

1. An RFID system for tracking tagged items, each item having an RFID tag with an RFID tag antenna coil and each item held in a fixed location,
the RFID system comprising:
an RFID reader; and
an RFID antenna coil arrangement in communication with the RFID reader, the RFID antenna coil arrangement comprising a plurality of conductively connected antenna coils,
wherein a planar dimension of each antenna coil is:
oriented in a plane parallel to a longitudinal axis through a center of the RFID tag antenna coil associated with the respective tagged item, and positioned to be aligned with the fixed location that a respective tagged item is held in,
so that the RFID tag antenna coil couples with a fringing flux, being magnetic field lines that spread out further away from the antenna coil, produced by the antenna coil that passes through an inner area of the RFID tag antenna coil.

2. The RFID system of claim 1, wherein each antenna coil has a circumference similar to its respective tagged item, and each antenna coil is positioned to align its circumference with the circumference of its respective tagged item.

3. The RFID system of claim 2, wherein the circumference of the coil is aligned with the circumference of the tagged item so that a portion of the tag antenna coil and a portion of the reader antenna coil are aligned and parallel.

4. The RFID system of claim 1, wherein the tagged items are cylindrical and have a variable radial orientation, and each antenna coil is substantially circular.

5. The RFID system of claim 1, wherein the RFID antenna coil arrangement comprises an array of antenna coils connected in series with adjacent coils connected together via a series connection.

6. The RFID system of claim 5, wherein each antenna coil of the array is positioned to be aligned with the fixed location if a respective tagged item.

7. The RFID system of claim 5, wherein the array comprises:
an input conductor forming a first series of coil elements; and
an output conductor forming a second series of coil elements,
wherein the first series of coil elements and the second series of coil elements are conductively connected, and wherein the first series of coil elements is superjacent or subjacent to the second series of coil elements so that resulting magnetic fields from the first series and the second series sum together to enhance a magnitude of a magnetic field produced by the RFID antenna coil arrangement.

8. The RFID system of claim 1, wherein the RFID antenna coil arrangement is configured to be incorporated into a container for holding tagged items.

9. The RFID system of claim 8, wherein the container comprises receiving zones for receiving and holding items in fixed locations, and wherein each antenna coil is positioned to be aligned with said fixed locations.

10. The RFID system of claim 1, further comprising:
a ferrite layer; and
an aluminium layer,
wherein the ferrite and aluminium layers are provided under the RFID antenna coil arrangement.

11. The RFID system of claim 10, wherein:
the RFID antenna coil arrangement is incorporated in a printed circuit board (PCB), and
the PCB, ferrite layer and aluminium layer form a sandwich structure.

* * * * *